(12) United States Patent
White et al.

(10) Patent No.: US 7,585,031 B2
(45) Date of Patent: Sep. 8, 2009

(54) WHEEL HUB WITH LUBRICANT FILL PORT

(75) Inventors: Jay D. White, Massillon, OH (US); Larry B. Hester, Dayton, OH (US); Kenneth D. Mutzner, Logan, OH (US); Michael W. Wilcheck, Kettering, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 51 days.

(21) Appl. No.: 11/828,546

(22) Filed: Jul. 26, 2007

(65) Prior Publication Data

US 2008/0024003 A1  Jan. 31, 2008

Related U.S. Application Data

(60) Provisional application No. 60/833,684, filed on Jul. 27, 2006.

(51) Int. Cl.
*B60B 27/00* (2006.01)
(52) U.S. Cl. .................. 301/105.1; 301/108.4; 384/544
(58) Field of Classification Search ............. 301/105.1, 301/108.1, 108.2, 108.3, 108.4, 108.5, 124.1; 384/462, 544, 473, 474; 184/105.1, 105.3, 184/92, 7.2, 5; 220/327, 328
See application file for complete search history.

(56) References Cited

U.S. PATENT DOCUMENTS

| | | | | |
|---|---|---|---|---|
| 2,723,168 | A | * | 11/1955 | Carroll ........................ 384/380 |
| 3,917,362 | A | * | 11/1975 | Stedman ...................... 384/418 |
| 4,027,743 | A | * | 6/1977 | Deller et al. .................. 184/6.4 |
| 5,042,679 | A | * | 8/1991 | Crowson et al. ......... 220/259.3 |

(Continued)

FOREIGN PATENT DOCUMENTS

EP          0521719 B1       1/1993

(Continued)

OTHER PUBLICATIONS

Two photographs of a drive-axle wheel hub manufactured by Gunite Corporation, wheel hub believed to be publicly available since at least as early as Jun. of 2005.

*Primary Examiner*—S. Joseph Morano
*Assistant Examiner*—Kip T Kotter
(74) *Attorney, Agent, or Firm*—Krugliak, Wilkins, Griffiths & Dougherty Co., L.P.A.; David P. Dureska; Edward T. Kennedy (57) ABSTRACT

A non-drive axle depends from a heavy-duty vehicle. Each one of a pair of wheel end assemblies is mounted on a respective one of the ends of the non-drive axle. Each wheel end assembly includes a pair of bearings mounted on a spindle of the axle, and a wheel hub rotatably mounted on the bearings. A cavity is formed in the wheel end assembly between the bearings. A port is formed in the wheel hub and extends generally parallel to a central axis of the wheel hub, and communicates with the outboard surface of the wheel hub and the cavity. Lubricant for the bearings is introduced into the cavity by means of the port, and the port is tapped to receive a plug to seal it and contain the lubricant in the cavity. The port also receives a bolt that secures a hubcap to the wheel hub.

12 Claims, 4 Drawing Sheets

U.S. PATENT DOCUMENTS

| | | | |
|---|---|---|---|
| 5,492,393 A | | 2/1996 | Peisker et al. |
| 5,658,053 A | * | 8/1997 | Vencill et al. ............ 301/105.1 |
| 5,860,708 A | * | 1/1999 | Borders et al. ........... 301/108.1 |
| 2005/0236886 A1 | * | 10/2005 | Hall et al. ................ 301/105.1 |
| 2008/0023270 A1 | * | 1/2008 | White et al. ............. 184/105.2 |

FOREIGN PATENT DOCUMENTS

| | | | | |
|---|---|---|---|---|
| KR | 2004051629 | A | * | 6/2004 |

* cited by examiner

WHEEL HUB WITH LUBRICANT FILL PORT

CROSS-REFERENCE TO RELATED APPLICATION

This application claims the benefit of U.S. Provisional Patent Application Ser. No. 60/833,684, which was filed on Jul. 27, 2006.

BACKGROUND OF THE INVENTION

1. Technical Field

The invention relates to wheel end assemblies, and in particular to wheel end assemblies for non-drive axles of heavy-duty vehicles, such as tractor-trailers. More particularly, the invention is directed to a wheel hub of a heavy-duty wheel end assembly, in which the wheel hub includes a lubricant fill port that is formed in an existing hubcap bolt hole and which has an internal plug for ensuring containment of the lubricant within the wheel end assembly.

2. Background Art

For many years, the heavy-duty vehicle industry has utilized wheel end assemblies which typically are mounted on each end of one or more non-drive axles. Each wheel end assembly typically includes a hub rotatably mounted on a bearing assembly, which includes an inboard bearing and an outboard bearing, which are in turn immovably mounted on the outboard end of the axle, commonly known as an axle spindle. As is well known to those skilled in the art, for normal operation of the wheel end assembly to occur, the bearing assembly and surrounding components must be lubricated with oil or grease. Therefore, the wheel end assembly must be sealed to prevent leakage of the lubricant, and also to prevent contaminants from entering the assembly, both of which could be detrimental to its performance. More specifically, a hubcap is mounted on an outboard end of the wheel hub, and a main seal is rotatably mounted on an inboard end of the hub and the bearing assembly in abutment with the axle spindle, resulting in a closed or sealed wheel end assembly.

On non-drive axles, such as trailer axles, it is desirable to retain a predetermined amount of lubricant in the wheel end assembly, which increases the life of the bearing assembly, in turn reducing the cost of maintaining and/or replacing the bearing assembly. Historically, oil has been used as the lubricant for the bearing assemblies, but it may not be the optimum lubricant for achieving the goal of increased bearing assembly life. More particularly, if the main seal on the wheel hub assembly degrades, there is a tendency for the oil to leak out of the assembly due to its relatively low viscosity in comparison to other lubricants. When the oil leaks out, the bearing assembly may become under-lubricated, which reduces its life. In addition, in the event of such an oil leak, the main seal usually must be repaired or replaced. Moreover, when the oil leaks out of the wheel end assembly, it may leak onto components of an associated brake system, such as the brake shoes, which must then be repaired, thereby increasing the cost associated with an oil leak. Such potential disadvantages associated with oil leaks have led to increasing use of semi-fluid grease as a replacement for oil as a lubricant for bearing assemblies in wheel end assemblies on non-drive axles.

The higher viscosity of semi-fluid grease causes it to flow less readily than oil, which is an advantage in reducing potential leaks, but creates the need for alternative methods of filling the wheel end assembly with lubricant. That is, with oil, a hole typically is provided in the hubcap, enabling the oil to be poured into the sealed wheel end assembly through the hubcap according to methods that are known in the art. However, semi-fluid grease does not readily flow to both the inboard and outboard bearings and the hub area proximate the bearings using such a hubcap fill hole. Thus, various prior art methods have been developed for filling the wheel end assembly with the proper amount of semi-fluid grease and/or other types of lubricant.

One such prior art method involves mounting only the inboard bearing of the bearing assembly on the axle spindle prior to adding semi-fluid grease to the wheel hub. In the prior art method, the inboard bearing is mounted on the axle spindle, and the wheel hub is mounted on the inboard bearing without the outboard bearing and without a retaining nut, the latter of which typically is used to secure the position of the bearings and the hub on the axle spindle. A nozzle is inserted in the gap between the axle spindle and the hub, and a pre-measured amount of semi-fluid grease is pumped into the gap against the inboard bearing. Once the grease has been added, the outboard bearing is mounted on the axle spindle and the retaining nut is installed and tightened onto the axle spindle.

This method includes a distinct disadvantage, since the lack of the installation of the outer bearing during grease introduction requires that an operator maintain a relatively horizontal position of the wheel hub to prevent damaging the main seal of the wheel end assembly. That is, without the outer bearing in place, there is a tendency for the outboard end of the wheel hub to drop down onto the axle spindle, which in turn can kink or damage the main seal at the inboard end of the wheel hub. In addition, while this prior art method may be employed somewhat efficiently during initial assembly of the wheel end assembly with factory-trained assemblers, it is much less practical for use in the field, such as during servicing of the wheel end assembly, since the wheel end assembly would have to be at least partially disassembled just to add lubricant. As is well-known in the art, it is desirable for lubrication of a wheel end assembly in the field to be performed with minimal disassembly.

Another prior art method involves using a wheel hub that includes a radially-oriented fill port that is formed in the hub wall between the inboard and outboard bearings, and pumping a pre-measured amount of semi-fluid grease into the wheel end assembly through this port. After the lubricant is added, a threaded plug is installed in the port to prevent the lubricant from exiting the wheel hub during service. More particularly, the plug may include a pipe-style interfering thread, or may include a standard thread that compresses an O-ring, which seals the port. This method is preferred over the above-described first prior art method, because the main seal and bearing assembly can be installed with proper alignment before the lubricant is added, so that the main seal typically is not subject to damage during the grease fill operation.

The radially-oriented fill port design is well-known in the art and is relatively simple to manufacture, as long as the wall of the wheel hub has a sufficient thickness to allow an adequate number of threads to be formed to secure the above-described threaded plug in the port. However, when high-strength, thin-wall wheel hub constructions are employed, a radially-oriented fill port formed in the wall of the wheel hub is not practical, since there may not be enough wall thickness in such a wheel hub to form adequate threads to secure a threaded plug. In addition, the formation of the radially-oriented port involves an additional manufacturing operation, which undesirably increases the cost of the wheel hub.

Yet another prior art method of adding lubricant to a wheel end assembly exists, but this method applies only to drive axles, rather than non-drive axles. More specifically, in order to transmit drive torque to a drive wheel, a drive axle and wheel end assembly typically includes a rotating drive shaft that extends through a non-rotating axle spindle. A wheel hub is rotatably mounted on the axle spindle via a bearing assembly, and a set of axially-oriented holes are formed in the outboard end of the wheel hub. The drive shaft is connected at its outboard end to an outboard plate or flange, in which holes are formed that align with the holes in the wheel hub. Drive studs extend through the holes in the plate and into the aligned holes in the wheel hub, where they are seated with an interference fit. In this manner, drive torque from the drive axle is transferred through the plate to the drive studs and to the wheel hub, which rotates about the axle spindle on the bearing assembly for turning the vehicle wheels.

In the prior art lubrication method for such a drive-axle wheel end assembly, one of the holes in the wheel hub, which typically is of a fairly large diameter, such as about ⅝ of an inch, is drilled further inboardly until it breaks into a cavity formed in the wheel hub between the inboard and outboard bearings. Oil-type lubricant then is added into the wheel hub cavity, which enables the lubricant to reach the bearings. Once the proper amount of oil is inserted, the interference-fit drive stud is installed into the wheel hub, and a nut is installed on the outboard end of the stud to secure the connection of the plate to the wheel hub. Once the drive stud is installed in the wheel hub, the stud is not intended to be removed. However, if the drive stud is installed improperly, it may back out during service, in which case centrifugal force could force the lubricant out of the wheel hub, thereby potentially leading to damage of the bearings. More importantly, this method cannot be used on wheel end assemblies for non-drive axles, since such wheel end assemblies lack the structure of drive-axle wheel hubs, and in particular, the outboard plate drive stud assembly, and associated holes formed in the wheel hub. In addition, as described above, this prior art method utilizes oil as the lubricant, rather than semi-fluid grease.

Thus, the above-described disadvantages of prior art methods for properly filling non-drive wheel hubs with semi-fluid grease, as well as the unacceptability of prior art methods employed to fill drive axle wheel hubs due to the differing structure of prior art non-drive axle wheel hubs, makes it desirable to develop a non-drive axle wheel hub that is capable of being filled with semi-fluid grease without manipulation of the outboard bearing or using a radially-oriented fill port, while being economical to manufacture. The present invention satisfies this need.

SUMMARY OF THE INVENTION

An objective of the present invention is to provide a non-drive axle wheel hub that is capable of being filled with semi-fluid grease without removing the outboard bearing.

Another objective of the present invention is to provide a non-drive axle wheel hub that is capable of being filled with semi-fluid grease without using a radially-oriented fill port.

Yet another objective of the present invention is to provide a non-drive axle wheel hub that is capable of being filled with semi-fluid grease in a simple manner, and which is economical to manufacture.

These objectives and others are obtained by the improved wheel hub of the present invention. In an exemplary embodiment of the invention, a wheel end assembly includes the improved wheel hub, and further includes a pair of bearings mounted on a spindle of a non-drive axle of a heavy-duty vehicle. The wheel hub is rotatably mounted on the bearings, and the bearings, wheel hub and axle spindle define a cavity in the wheel end assembly. The improved wheel hub includes a port that is formed in the wheel hub, and the port extends generally parallel to a central axis of the wheel hub. The port communicates with an outboard surface of the wheel hub and the cavity. Lubricant for the bearings is capable of being introduced into the cavity through the port, and the port is capable of being closed to contain the lubricant in the cavity.

These objectives and others are also obtained by the method for introducing semi-fluid grease into a wheel end assembly mounted on a non-drive axle of a heavy-duty vehicle of the present invention. In an exemplary embodiment, the method includes providing a wheel end assembly. The wheel end assembly includes a pair of bearings mounted on a spindle of the non-drive axle, and a wheel hub rotatably mounted on the bearings. The bearings, wheel hub and axle spindle define a cavity in the wheel end assembly. A port is formed in the wheel hub, and the port extends generally parallel to a central axis of the wheel hub, and communicates with an outboard surface of the wheel hub and the cavity. A nozzle, which is in fluid communication with a source of semi-fluid grease, is inserted into the port, and the semi-fluid grease is caused to flow through the nozzle and into the port, thus flowing into the wheel end assembly cavity. The flow of semi-fluid grease is terminated when a predetermined amount of the semi-fluid grease has been introduced into the wheel end assembly.

BRIEF DESCRIPTION OF THE DRAWINGS

The preferred embodiments of the present invention, illustrative of the best mode in which applicants have contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENTS

Figure 1:
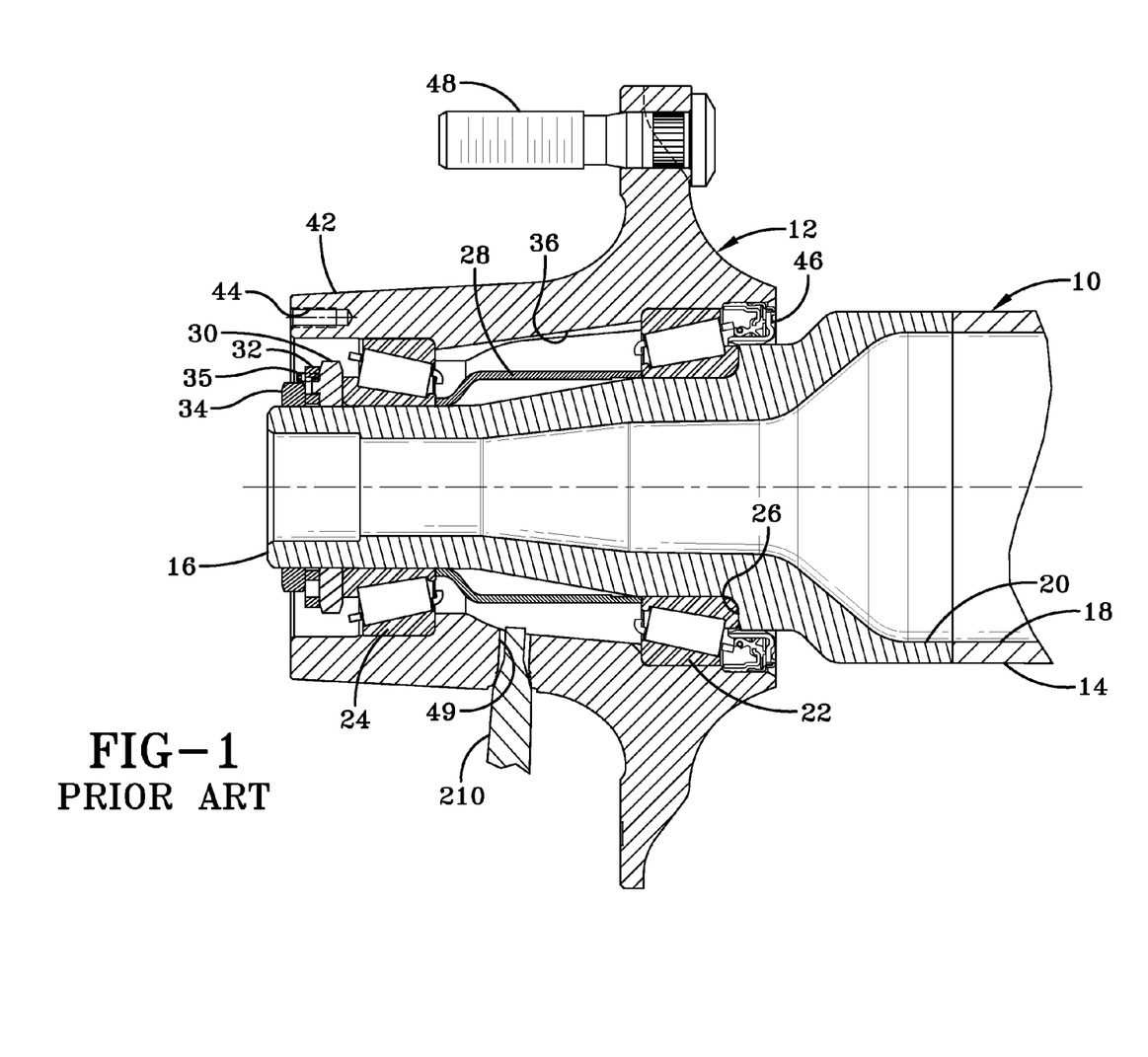
FIG. 1 is a fragmentary longitudinal cross-sectional view of a portion of a typical axle and an axle spindle and wheel end assembly of the prior art, including a prior art wheel hub formed with a radially-oriented lubricant fill port, and showing a device inserted in the fill port for introducing semi-fluid grease into the wheel end assembly.

In order to better understand the wheel hub of the present invention, a prior art wheel hub is shown incorporated into an axle spindle and wheel end assembly for a heavy-duty vehicle in FIG. 1 and now will be described. Non-drive axle 10 depends from and extends transversely across the trailer of a heavy-duty tractor-trailer (not shown). A typical heavy-duty tractor-trailer includes one or more non-drive axles 10 suspended from the trailer, with each of the axles having a wheel end assembly 12 mounted on each end of the axle. For the sake of clarity, only one axle end and wheel end assembly 12 will be described herein. Axle 10 includes a central tube 14, and an axle spindle 16 is integrally connected by any suitable means, such as welding, to each end of the central tube. Axle central tube 14 generally is tubular-shaped and is formed with an internal cavity 18. Axle spindle 16 is tapered and is formed with a correspondingly tapered internal cavity 20.

Wheel end assembly 12 includes a bearing assembly having an inboard bearing 22 and an outboard bearing 24 immovably mounted on the outboard end of axle spindle 16. That is, inboard bearing 22 is mounted on the outer diameter of axle spindle 16 with its inboard surface in abutment with a shoulder 26 formed on the axle spindle. Outboard bearing 24 is mounted on axle spindle 16 near the outboard end of the axle spindle, and thereby includes a smaller inner diameter than inboard bearing 22 due to the taper of the axle spindle.

A wheel hub 42 is rotatably mounted on inboard and outboard bearings 22, 24 in a manner well known to those skilled in the art. A cavity 36 is defined in wheel hub 42 between inboard and outboard bearings 22, 24 and axle spindle 16. A correspondingly-tapered bearing spacer 28 optionally is disposed between bearings 22, 24 in cavity 36 to conveniently maintain proper spacing between the bearings. A nut assembly, which includes an inboard nut 30, a lock washer 32, an outboard nut 34, and a set screw 35, threadably engages the outboard end of axle spindle 16 and secures bearings 22, 24 and bearing spacer 28 in place.

A hubcap (not shown) is mounted on the outboard end of hub 42 by a plurality of bolts that each pass through a respective one of a plurality of openings formed in the hubcap, and threadably engage a respective one of a plurality of aligned threaded openings 44 formed in the hub. In this manner, the hubcap closes the outboard end of wheel end assembly 12. A main continuous seal 46 is rotatably mounted on the inboard end of wheel end assembly 12 and closes the inboard end of the assembly. More particularly, seal 46 is mounted on wheel end assembly 12 in a suitable manner and radially bridges hub 42 and axle spindle 16 to seal cavity 36. A plurality of interference-fit studs 48 (only one shown) are used to mount a brake drum, tire rim and tire (not shown) on wheel end assembly 12.

In order to maintain proper lubrication and operation of inboard and outboard bearings 22, 24, a suitable amount of lubricant (not shown) is introduced into cavity 36. For example, in the prior art, a radially-oriented port 49 is formed in hub 42 between inboard and outboard bearings 22, 24. A nozzle 210 that is in fluid communication with a tank (not shown) containing semi-fluid grease is inserted into radial port 49 to pump semi-fluid grease into cavity 36. Once the proper amount of lubricant is introduced into cavity 36, a plug (not shown) is inserted into port 49 and is secured via mating threads (not shown) formed in the plug and the port. As described above, the plug may include a pipe-style interfering thread, or may include a standard thread that compresses an O-ring (not shown), which seals port 49 to prevent lubricant from exiting wheel end assembly 12.

As mentioned above, when high-strength materials are used to form hub 42, which enables the use of a thinner wall to desirably reduce the weight of the hub, there may not be enough wall thickness to form adequate threads in radially-oriented port 49 to secure the threaded plug. In addition, the formation of port 49 requires an additional manufacturing operation, which increases the cost of hub 42.

In other prior art hub designs that do not include radially-oriented port 49, hub 42 is mounted on inboard bearing 22 without outboard bearing 24 or nut assembly 30, 32, 34, 35, in order to enable lubricant to be pumped into cavity 36. Once the proper amount of lubricant is introduced into cavity 36, outboard bearing 24 and nut assembly 30, 32, 34, 35 are installed. However, the lack of support at the outboard end of hub 42 during filling increases the possibility of the outboard end of the hub dropping onto axle spindle 16, which in turn can kink or otherwise damage main seal 46 at the inboard end of the wheel hub. Such disadvantages have created a need in the art for a wheel hub that can be easily be filled with semi-fluid grease with both bearings 22, 24 installed, and without the use of a radial fill port, while being economical to manufacture. The present invention satisfies this need, as will now be described.

Figure 2:
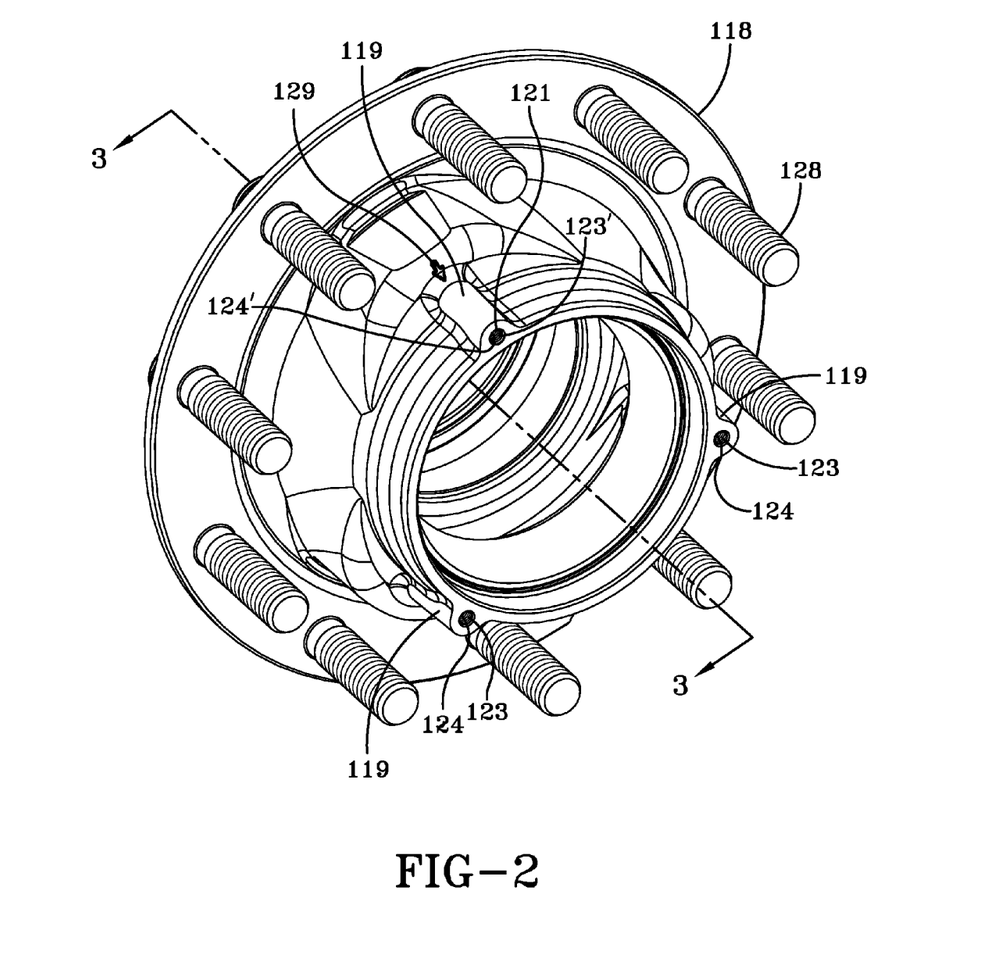
FIG. 2 is a top outboard perspective view of a wheel hub of the present invention.
Figure 3:
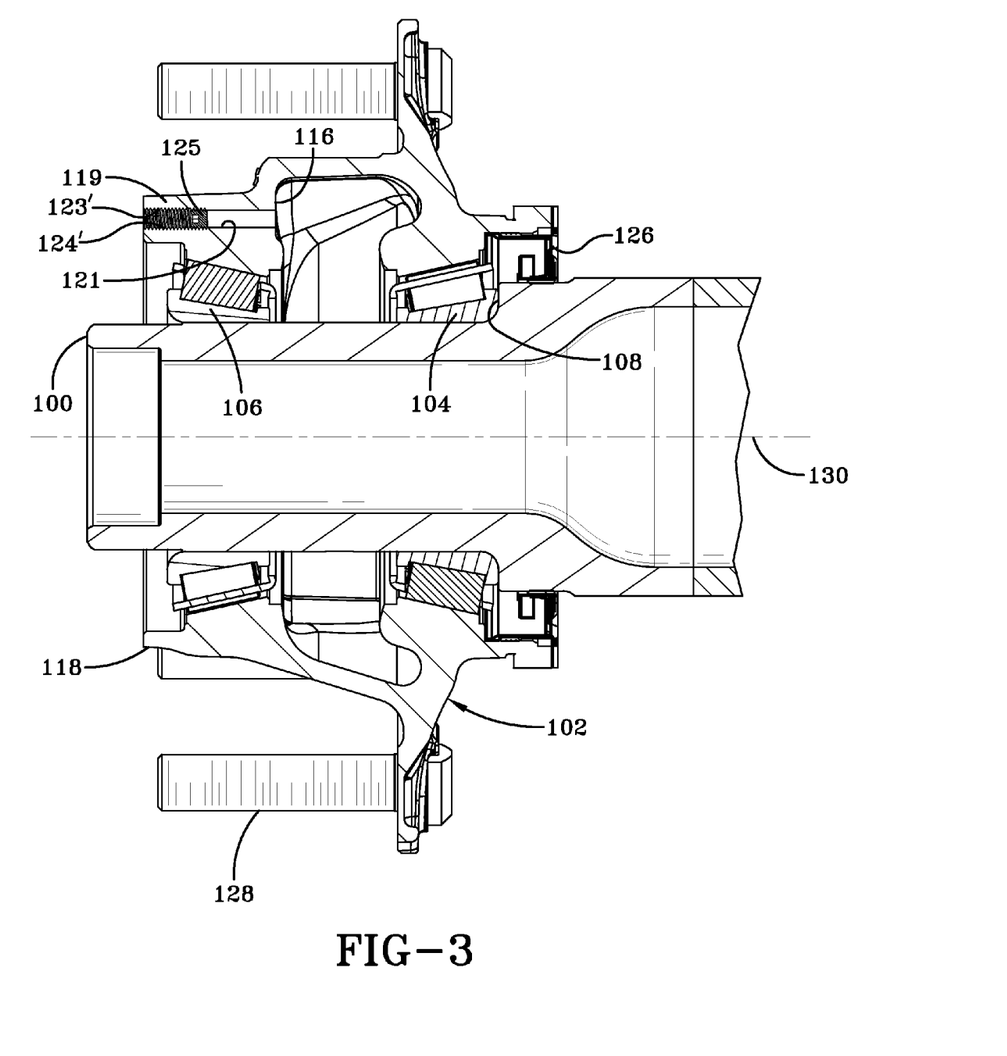
FIG. 3 is a fragmentary longitudinal cross-sectional view of the wheel hub shown in FIG. 2 taken along line 3-3, shown incorporated into a wheel end assembly that is mounted on an axle spindle.

Turning now to FIGS. 2 and 3, a wheel hub of the present invention is shown in FIG. 2 and is indicated at 118, and in FIG. 3 is shown incorporated into a wheel end assembly 102 that is assembled on an axle spindle 100. Wheel end assembly 102 includes a bearing assembly having an inboard bearing 104 and an outboard bearing 106 that are immovably mounted on the outboard end of axle spindle 100. More particularly, inboard bearing 104 is mounted on the outer diameter of axle spindle 100 and its inboard surface is in abutment with a shoulder 108 formed on the axle spindle. Outboard bearing 106 is mounted on the outer diameter of axle spindle 100 near the outboard end of the axle spindle, as known in the art.

Wheel hub 118 is rotatably mounted on inboard and outboard bearings 104, 106 in a manner well known to those skilled in the art. A cavity 116 is defined in wheel hub 118 between inboard and outboard bearings 104, 106 and axle spindle 100. A bearing spacer (not shown) optionally is disposed between bearings 104, 106 in cavity 116 to conveniently maintain proper spacing between the bearings. A nut assembly (not shown) threadably engages the outboard end of axle spindle 100 and secures bearings 104, 106 and any bearing spacer in place.

Figure 4:
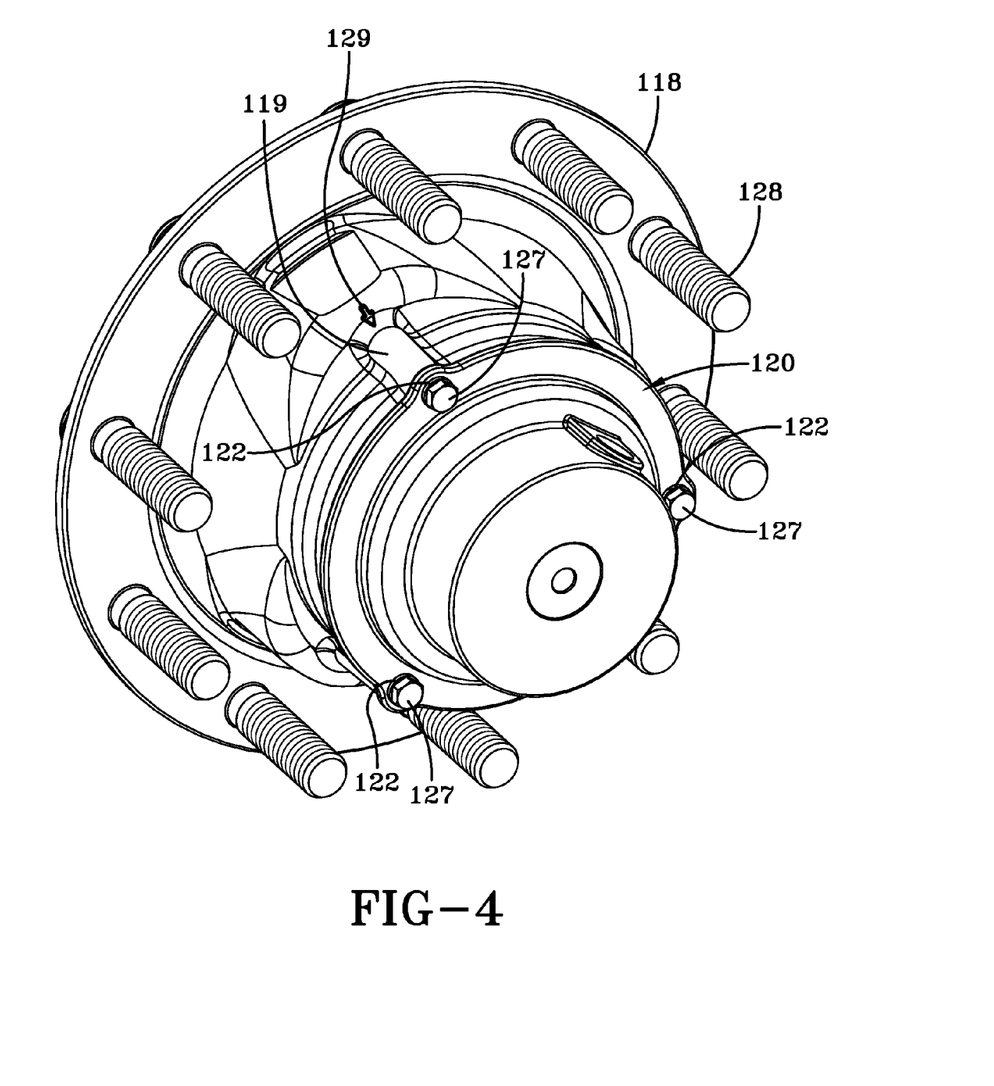
FIG. 4 is a top outboard perspective view of the wheel hub shown in FIG. 2, with a hubcap installed on the wheel hub.

With additional reference to FIG. 4, a hubcap 120 is mounted on the outboard end of hub 118 by a plurality of bolts 127 that each pass through a respective one of a plurality of openings 122 formed in the hubcap, and threadably engage a respective one of a plurality of aligned openings 124 (FIG. 2) formed in bosses 119 of the hub. Each opening 124 includes threads 123 formed therein to facilitate the threadable engagement of hubcap bolts 127. In this manner, hubcap 120 closes the outboard end of wheel end assembly 102. A main continuous seal 126 (FIG. 3) is rotatably mounted on the inboard end of wheel end assembly 102 and closes the inboard end of the assembly. More particularly, seal 126 is mounted on wheel end assembly 102 in a suitable manner and radially bridges hub 118 and axle spindle 100 to seal cavity 116. A plurality of threaded bolts 128 are used to mount a brake drum, tire rim and tire (not shown) on wheel end assembly 102.

With particular reference to FIG. 3, in accordance with an important feature of the present invention, an axially-aligned port 121 is formed in hub 118 so that a suitable amount of semi-fluid grease (not shown) can be introduced into cavity 116, thereby maintaining proper lubrication and operation of inboard and outboard bearings 104, 106. Preferably, as best shown in FIGS. 2 and 3, a selected one of hubcap bolt openings 124, referred to herein as selected opening 124', is drilled deeper inboardly than the other hubcap bolt openings, and into cavity 116 to form fill port 121. In this manner, axially-oriented fill port 121 extends generally parallel to central axis 130 (FIG. 3) of hub 118 so that a continuous opening is formed between the outboard surface of the wheel hub and cavity 116. Fill port 121 then is tapped deep enough from its outboard end with threads 123' to allow adequate space for a threaded internal plug 125 to be installed to seal fill port 121, and for hubcap bolt 127 (FIG. 4) to be installed outboardly of the threaded internal plug. Preferably, selected opening 124', and hence fill port 121, is of the same diameter as the other hubcap bolt openings 124, for example, about 5/16 of an inch.

Optionally, a visual indicator 129 (FIG. 2) is placed on the outer surface of hub 118 proximate selected opening 124' in order to enable a user to determine which of hubcap openings 124 is the selected opening and thereby includes fill port 121.

To fill wheel end assembly 102 with lubricant, hub 118 is installed on axle spindle 100 with main seal 126 and bearings 104, 106, and the bearings are adjusted to their proper settings, as known in the art. Hubcap 120 preferably is not installed at this point. A nozzle 210 (FIG. 1) that preferably is sized for fill port 121, and which is in fluid communication with a tank (not shown) containing semi-fluid grease, is inserted into the outboard end of the fill port and a metered amount of semi-fluid grease is injected into hub cavity 116 via the port, which communicates with the hub cavity. Alternatively, a portable container (not shown) having a convenient pre-measured amount of semi-fluid grease, and having a nozzle sized for fill port 121 is inserted into the outboard end of the fill port to inject semi-fluid grease into hub cavity 116. Such a portable container is more fully described in a separate application being filed concurrently herewith by one of the assignees of the present invention, Hendrickson USA, L.L.C.

Since hubcap 120 preferably is not yet installed at this point, air inside hub cavity 116 is able to escape as the lubricant is injected into the hub, thereby enabling the semi-fluid grease to flow relatively smoothly, which provides an easy fill operation. After the lubricant is injected, plug 125 is threadably engaged with threads 123' formed in fill port 121, until it bottoms out inboardly on the threads, at which point it is held in place by mechanical wedging of the plug into the unfinished form of the last few tapped threads, and/or by utilizing a thread-sealing compound. Plug 125 thus seals port 121 to enable the lubricant to be contained within hub cavity 116.

Preferably, plug 125 is removable from port 121. In addition, it should be noted that, while internal plug 125 is described herein as a threaded plug, such as a set screw, other means that are known in the art to obstruct or close port 121 may be used without affecting the overall concept or operation of the invention. For example, plug 125 may optionally be an oversized elastomeric plug; an epoxy sealant; a pop rivet; a staked ball bearing; a check valve; a rigid round or cylindrical body with an o-ring, a gasket, an elastomeric coating or a plastic coating; and/or a combination thereof, all of which are capable of being inserted into and obstructing or closing fill port 121.

Once plug 125 is in place, hubcap 120 is installed and hubcap bolts 127 are tightened in hubcap bolt openings 124 and selected opening 124' formed in bosses 119 of hub 118, with the hubcap bolts threadably engaging threads 123, 123' formed in the respective bolt openings. Alternatively, hubcap 120 may be installed by inserting bolts 127 in bolt openings 124 before filling wheel end assembly 102 with lubricant. More particularly, bolts 127 may be threaded into each respective non-selected opening 124, while selected opening 124' remains open. Then, a nozzle 210 (FIG. 1) that is in fluid communication with a tank or other container having semi-fluid grease, as described above, is inserted through the appropriate hubcap opening 122 that is in alignment with selected opening 124'. Nozzle 210 thus is inserted into the outboard end of fill port 121, and a metered amount of semi-fluid grease then is injected into hub cavity 116. After the lubricant is injected, plug 125 is threadably engaged with threads 123' formed in fill port 121 to seal the port. Once plug 125 is in place, the remaining hubcap bolt 127 that corresponds to selected opening 124' is inserted and tightened in the selected opening.

By using plug 125 in selected opening 124' and in fill port 121 inboardly of hubcap bolt 127, the lubricant remains contained within wheel end assembly 102 in the event that the hubcap bolt is removed to service hub 118, and is not reinstalled properly, which may allow the hubcap bolt to work loose. That is, since non-drive axles have hubcaps 120 to protect wheel end assemblies 102 from contamination and lubrication loss, the hubcaps and their fastening bolts 127 generally are required to be removed every time a wheel end assembly is serviced. Because of the expected servicing of wheel end assembly 102 over the lifetime of a heavy-duty vehicle, hubcap bolts 127 may be improperly installed at some point. Since internal plug 125 in fill port 121 seals the lubricant within cavity 116 and isolates it from hubcap bolt 127, the possibility of accidental loss of wheel end lubricant in the event of an improper installation of the hubcap bolt therefore is reduced by this redundant closure of the fill port.

In this manner, wheel hub 118 of the present invention provides increased manufacturing efficiency over prior art hubs 42 (FIG. 1) having radially-oriented fill ports 49, as axially-oriented fill port 121 does not require a separate operation to drill and tap it. In addition, since fill port 121 is formed in the same operation as the other non-fill port hubcap bolt holes 124 in hub 118, standard taps to form threads 123, 123' preferably are used, enabling standard bolts 127 to also be used. Moreover, threaded portion 123' of fill port 121 is dual service, since it holds plug 125 to seal cavity 116 and it also holds hubcap bolt 127.

As an additional advantage over prior art wheel hubs 42 with radially-oriented fill ports 49, wheel hub 118 of the present invention can be formed of higher-strength materials and may thereby have a thinner hub wall to desirably decrease weight, since plug 125 securely seats in axially-oriented fill port 121 to seal hub cavity 116, rather than in a radially-oriented fill port. Also, as described above, hub 118 of the present invention is filled with lubricant while both inboard and outboard bearings 104, 106 support the hub, thereby preventing damage to main seal 126 experienced by prior art wheel hubs that require the outboard bearing to be removed for filling. Moreover, the use of internal plug 125 and hubcap bolt 127 provides a redundant closure of fill port 121 to seal the lubricant within cavity 116, thereby reducing the possibility of accidental loss of wheel end lubricant in the event of an improper installation of the hubcap bolt.

The present invention also includes a method for filling a non-drive axle wheel end assembly with semi-fluid grease using an axially-oriented fill port in the wheel hub and sealing the grease in the wheel end assembly with an internal plug in the fill port. The semi-fluid grease may be inserted into the wheel end assembly before or after the hubcap is installed on the wheel end assembly, as described above. The method includes steps in accordance with the description that is presented above and shown in FIGS. 2-4.

It is understood that the present invention finds application in all types of non-drive heavy-duty axle spindles and wheel end assemblies known to those skilled in the art, including other types of non-drive axle spindles and wheel end assemblies than those shown and described herein which are known to those skilled in the art, without affecting the concept or operation of the invention.

Accordingly, the improved non-drive axle wheel hub is simplified, provides an effective, safe, inexpensive, and efficient structure which achieves all the enumerated objectives, provides for eliminating difficulties encountered with prior art wheel hubs, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved non-drive axle wheel hub is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A wheel end assembly including an improved wheel hub, said wheel end assembly further including a pair of bearings mounted on a spindle of a non-drive axle of a heavy-duty vehicle, said wheel hub being rotatably mounted on said bearings, with the bearings, the wheel hub and said axle spindle defining a cavity in the wheel end assembly, the improvement comprising:
   a port formed in said wheel hub, said port extending generally parallel to a central axis of the wheel hub and communicating with an outboard surface of said wheel hub and said cavity, whereby lubricant for said bearings is capable of being introduced into the cavity through said port;
   a plug disposed in said port between said cavity and an outboard end of said wheel hub; and
   a bolt disposed in said port outboardly of said plug, said combination of said plug and said bolt providing a redundant closure for containing lubricant in said cavity.

2. The improved wheel hub of claim 1, wherein said plug is removable.

3. The improved wheel hub of claim 1, wherein said port is tapped and said plug is formed with threads that mate with said tapped port.

4. The improved wheel hub of claim 1, wherein said port is tapped and a said bolt secures a hubcap to said wheel hub.

5. The improved wheel hub of claim 1, wherein said wheel end assembly further includes a main seal mounted between said wheel hub and said axle spindle proximate an inboard end of said wheel hub to seal an inboard end of said wheel end assembly, and a hubcap removably mounted on an outboard end of said wheel hub to seal an outboard end of said wheel end assembly.

6. The improved wheel hub of claim 1, further comprising a visual indicator formed on an outside surface of said wheel hub to indicate the location of said port.

7. The improved wheel hub of claim 1, wherein said port is formed in a boss of said wheel hub.

8. A method for introducing semi-fluid grease into a wheel end assembly mounted on a non-drive axle of a heavy-duty vehicle, said method comprising the steps of:
   providing a wheel end assembly, said wheel end assembly including a pair of bearings mounted on a spindle of said non-drive axle and a wheel hub rotatably mounted on said bearings, with the bearings, said wheel hub and the axle spindle defining a cavity in said wheel end assembly;
   forming a port formed in said wheel hub, said port extending generally parallel to a central axis of the wheel hub, and communicating with an outboard surface of said wheel hub and said wheel end assembly cavity;
   inserting a nozzle into said port, said nozzle being in fluid communication with a source of semi-fluid grease;
   causing said semi-fluid grease to flow through said nozzle and into said port, whereby the semi-fluid grease flows into said wheel end assembly cavity;
   terminating said flow of semi-fluid grease when a predetermined amount of said semi-fluid grease has been introduced into said wheel end assembly;
   disposing a plug in said port after said flow of grease has been terminated; and
   disposing a bolt in said port outboardly of said plug, said combination of said plug and said bolt providing a redundant closure for containing lubricant in said cavity.

9. The method for introducing semi-fluid grease into a wheel end assembly of claim 8, wherein said port is tapped and said plug is formed with threads that mate with said tapped port, whereby said plug threadably engages said port.

10. The method for introducing semi-fluid grease into a wheel end assembly of claim 8, wherein said port is tapped, and said bolt secures a hubcap to said wheel hub.

11. The method for introducing semi-fluid grease into a wheel end assembly of claim 8, further comprising the step of installing a hubcap onto said wheel hub before causing said semi-fluid grease to flow through said nozzle and into said port.

12. The method for introducing semi-fluid grease into a wheel end assembly of claim 8, further comprising the step of installing a hubcap onto said wheel hub after causing said semi-fluid grease to flow through said nozzle and into said port.

* * * * *